(12) United States Patent
Wei

(10) Patent No.: US 12,459,422 B1
(45) Date of Patent: Nov. 4, 2025

(54) MOTORCYCLE LAMP

(71) Applicant: JUTE INDUSTRIAL CO., LTD., Taichung (TW)

(72) Inventor: Shih-Chieh Wei, Taichung (TW)

(73) Assignee: JUTE INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 19/077,621

(22) Filed: Mar. 12, 2025

(51) Int. Cl.
| | |
|---|---|
| *B60Q 1/115* | (2006.01) |
| *F21S 41/143* | (2018.01) |
| *F21S 41/19* | (2018.01) |
| *F21S 41/25* | (2018.01) |
| *F21S 41/663* | (2018.01) |
| *F21W 107/17* | (2018.01) |
| *F21Y 115/10* | (2016.01) |

(52) U.S. Cl.
CPC .............. *B60Q 1/115* (2013.01); *F21S 41/143* (2018.01); *F21S 41/192* (2018.01); *F21S 41/25* (2018.01); *F21S 41/663* (2018.01); *B60Q 2300/136* (2013.01); *F21W 2107/17* (2018.01); *F21Y 2115/10* (2016.08)

(58) Field of Classification Search
CPC ......... B60Q 1/115; F21S 41/25; F21S 41/663; F21S 41/143; F21S 41/192
See application file for complete search history.

(56) References Cited

U.S. PATENT DOCUMENTS

| | | | |
|---|---|---|---|
| 2016/0229473 A1* | 8/2016 | Inoue | B60Q 1/14 |
| 2022/0082227 A1* | 3/2022 | Menjo | F21S 41/255 |
| 2024/0263772 A1* | 8/2024 | Wang | F21V 23/0492 |
| 2024/0326685 A1* | 10/2024 | Kataoka | B60Q 1/14 |
| 2025/0093005 A1* | 3/2025 | Aichinger-Rosenberger .............. B60Q 1/08 |
| 2025/0249822 A1* | 8/2025 | Kataoka | B60Q 1/14 |
| 2025/0257857 A1* | 8/2025 | Baker | F21S 41/675 |

FOREIGN PATENT DOCUMENTS

DE     102018209061 A1 * 12/2019 ............. F21S 41/24

* cited by examiner

*Primary Examiner* — Christopher E Dunay
(74) *Attorney, Agent, or Firm* — Muncy, Geissler, Olds & Lowe, P.C.

(57) ABSTRACT

A motorcycle lamp includes: a lamp base including a mounting surface, and defining first and second directions; two main light devices spaced apart on the mounting surface and located oppositely in the first direction; only two auxiliary light devices spaced apart on the mounting surface and located oppositely in the second direction, each auxiliary light device including light emitting elements arranged in a direction non-parallel to the first direction, and an auxiliary light lens covering the light emitting elements; a controller connected to and configured to control the main light devices and the auxiliary light devices; and a tilt angle detector in communication with the controller, configured to detect and obtain a tilt angle data of the motorcycle; wherein the controller controls at least one of the light emitting elements of one of the auxiliary light devices to emit light according to the tilt angle data.

10 Claims, 11 Drawing Sheets

MOTORCYCLE LAMP

BACKGROUND OF THE INVENTION

Field of the Invention

The present invention relates to an illumination device, particularly to a motorcycle lamp.

Description of the Prior Art

For vehicle driving, it is extremely important to clearly observe the surrounding environment of the vehicle, which greatly affects driving safety. Therefore, in order to improve safety, especially when driving at night, the vehicle needs to use the illumination of the motorcycle lamp to brighten the surrounding environment and make it clearer to see.

During turns of vehicles such as motorcycles, the motorcycle lamp tilts with the vehicle body toward a side. The illumination area of the motorcycle lamp also tilts accordingly, resulting in an incomplete illumination of the surrounding environment ahead. The driver is unable to accurately and promptly understand the route and road conditions ahead, which may easily lead to traffic accidents and even serious personal injury or death. However, conventional motorcycle lamps do not include a mechanism to compensate for the displacement of the illumination area caused by the tilted state of the motorcycle. This results in illumination blind areas and significant driving risks.

The present invention is, therefore, arisen to obviate or at least mitigate the above-mentioned disadvantages.

SUMMARY OF THE INVENTION

The main object of the present invention is to provide a motorcycle lamp which compensates for the displacement of the illumination area caused by the tilted state of the motorcycle, thereby providing a wide illumination range without blind spots and enhancing driving safety.

To achieve the above and other objects, a motorcycle lamp is provided, wherein the motorcycle lamp includes: a lamp base including a mounting surface, and defining a first direction and a second direction perpendicular to each other; two main light devices spaced apart and disposed on the mounting surface, and located on opposite sides in the first direction; only two auxiliary light devices spaced apart and disposed on the mounting surface, and located on opposite sides in the second direction, each of the only two auxiliary light devices including a plurality of light emitting elements and an auxiliary light lens, the plurality of light emitting elements being arranged in a direction non-parallel to the first direction, the auxiliary light lens covering the plurality of light emitting elements; a controller connected to and configured to control the two main light devices and the only two auxiliary light devices; and a tilt angle detector in communication with the controller, configured to detect and obtain a tilt angle data of the motorcycle; wherein the controller controls at least one of the plurality of light emitting elements of one of the only two auxiliary light devices to emit light according to the tilt angle data.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
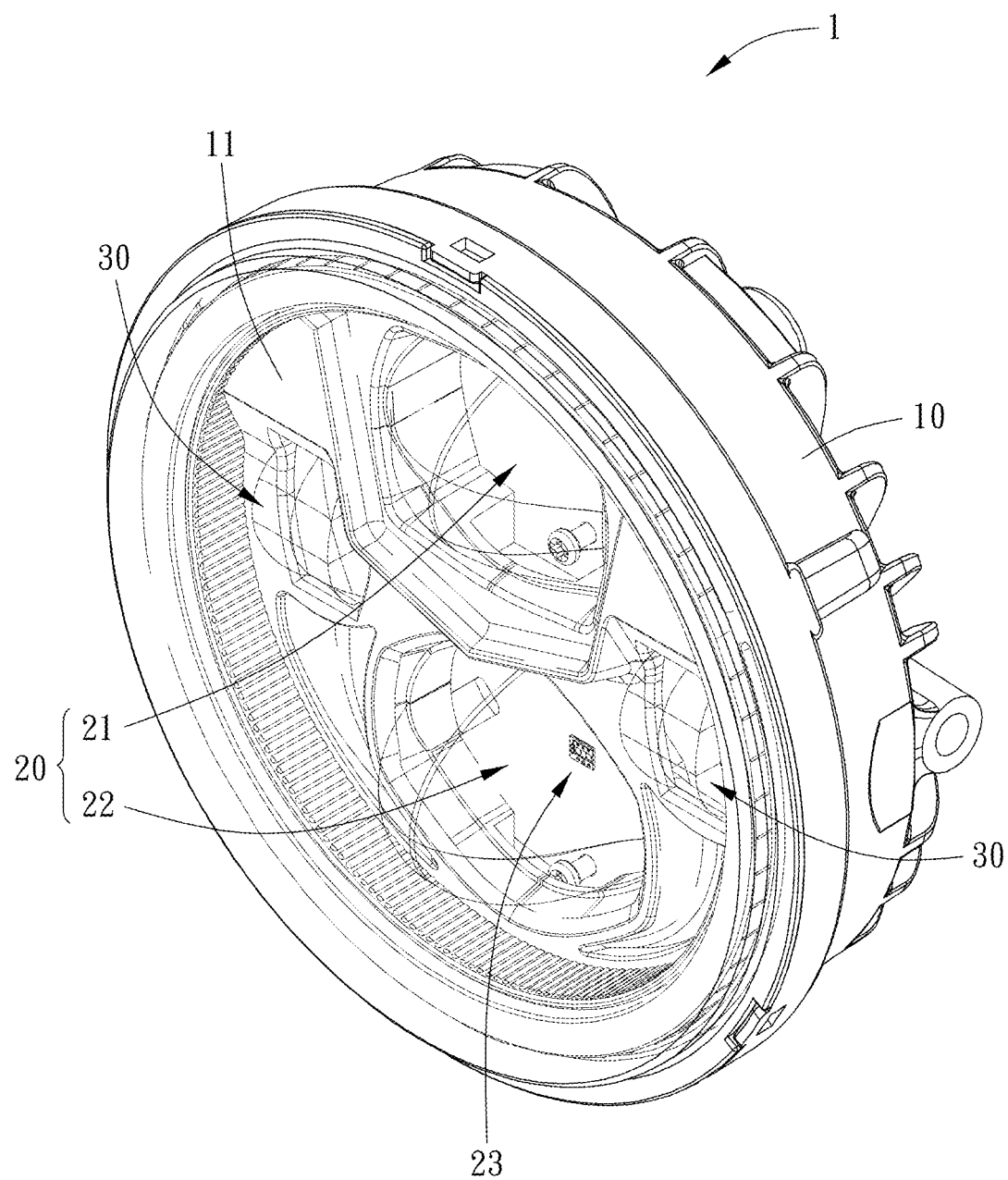
FIG. 1 is a perspective view of an exemplary embodiment of the present invention.
Figure 2:
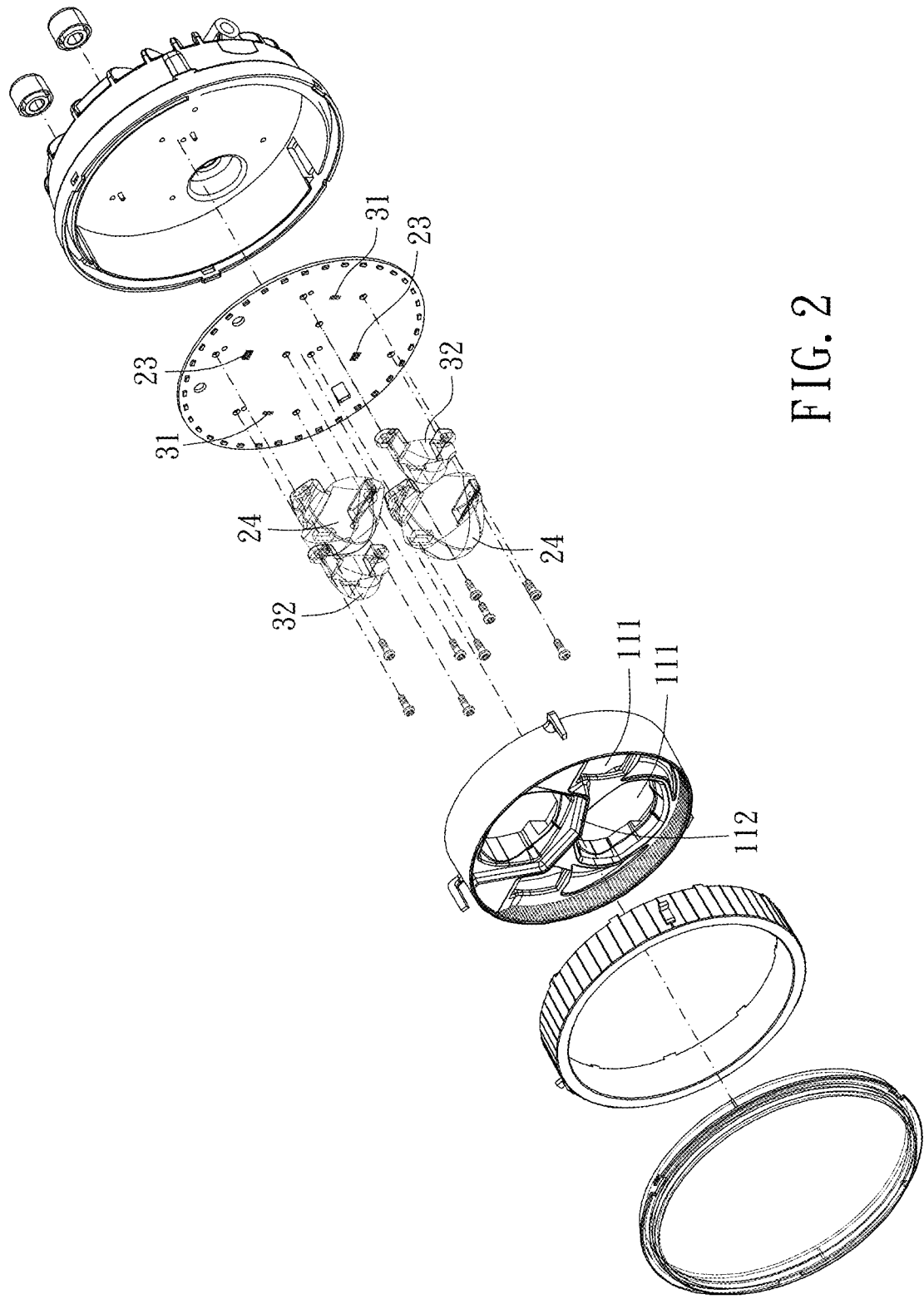
FIG. 2 is an exploded view of an exemplary embodiment of the present invention.
Figure 3:
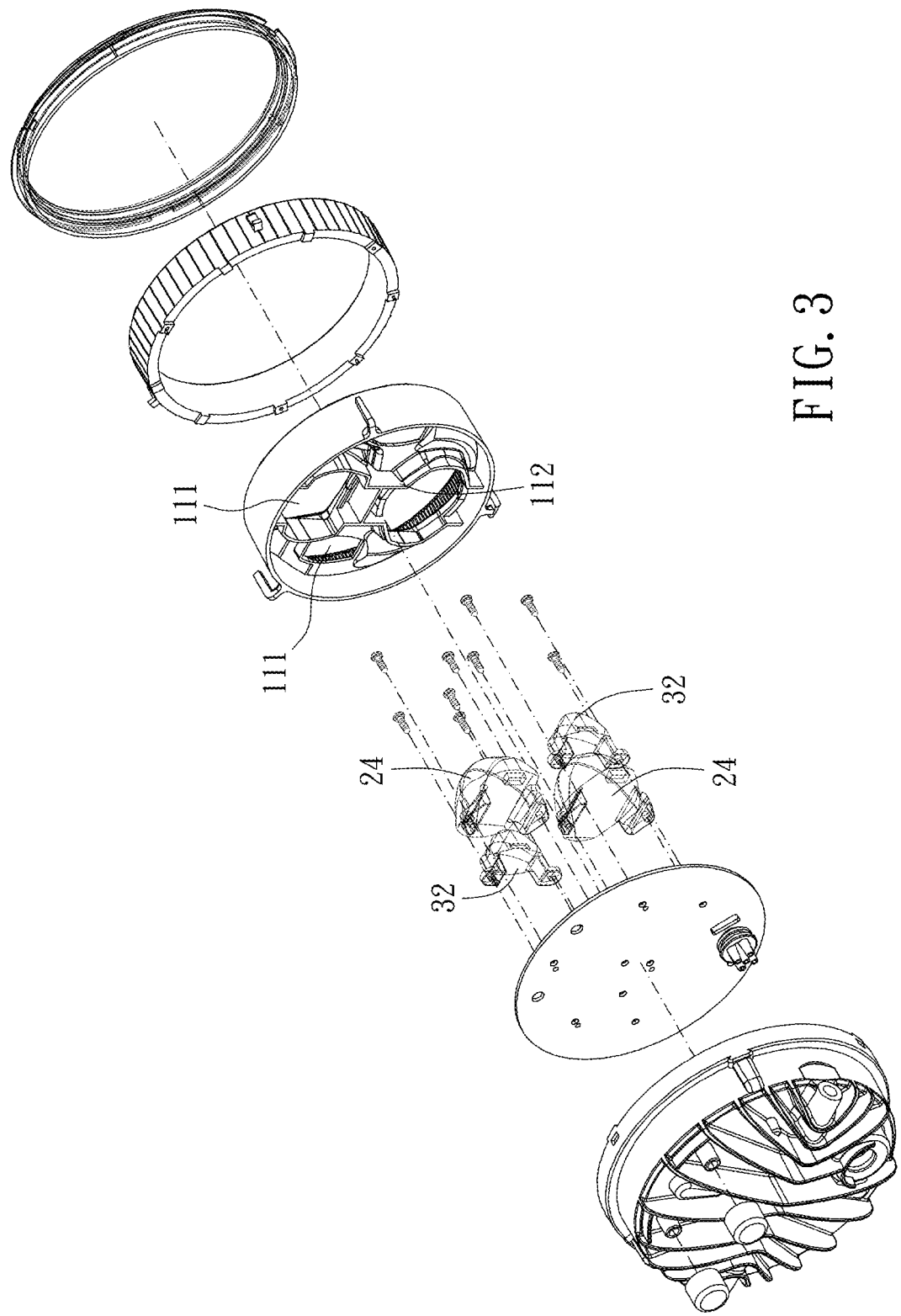
FIG. 3 is another exploded view of an exemplary embodiment of the present invention.
Figure 4:
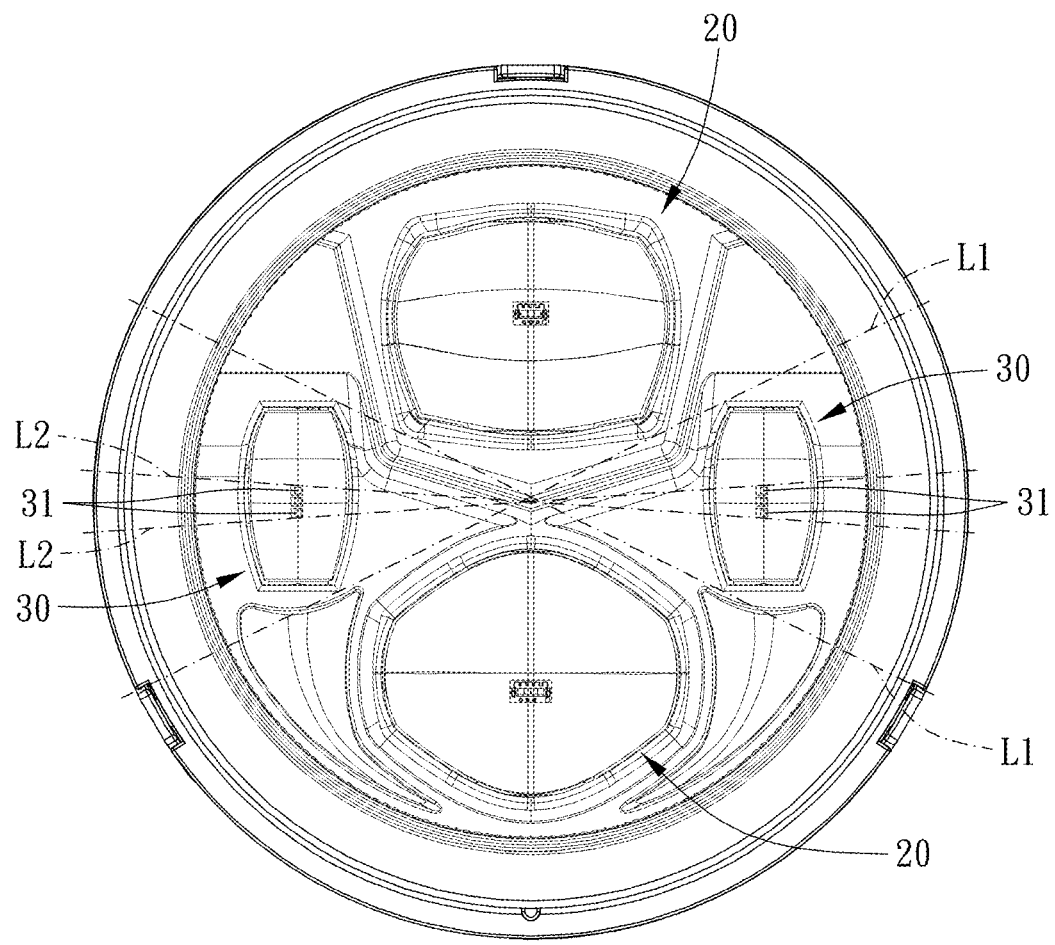
FIG. 4 is a front view of an exemplary embodiment of the present invention.
Figure 5:
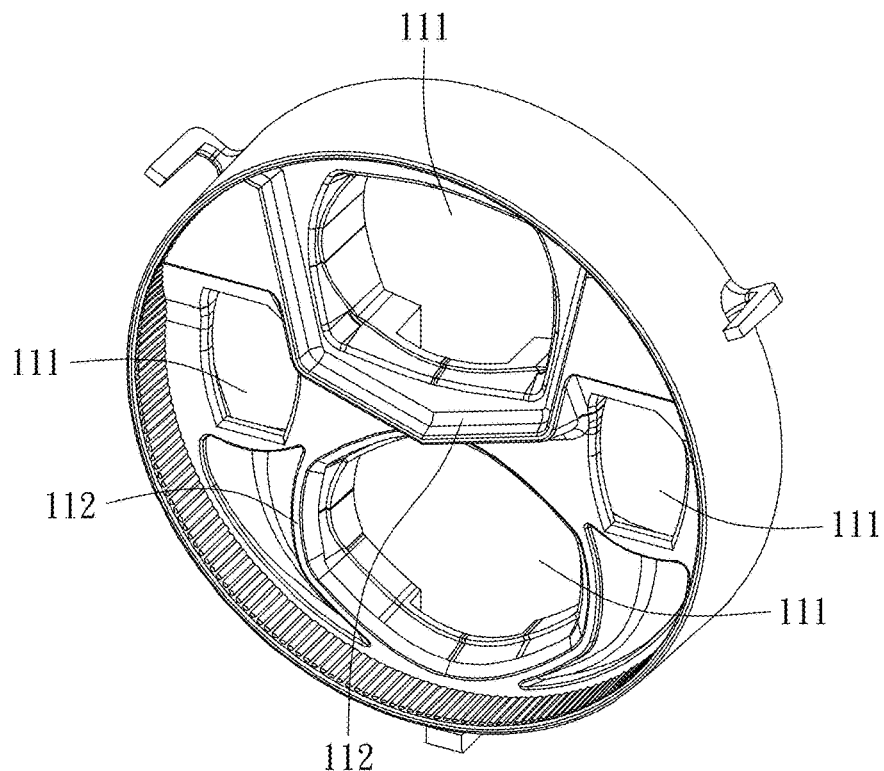
FIG. 5 is a perspective view of a portion of a lamp base of an exemplary embodiment of the present invention.
Figure 6:
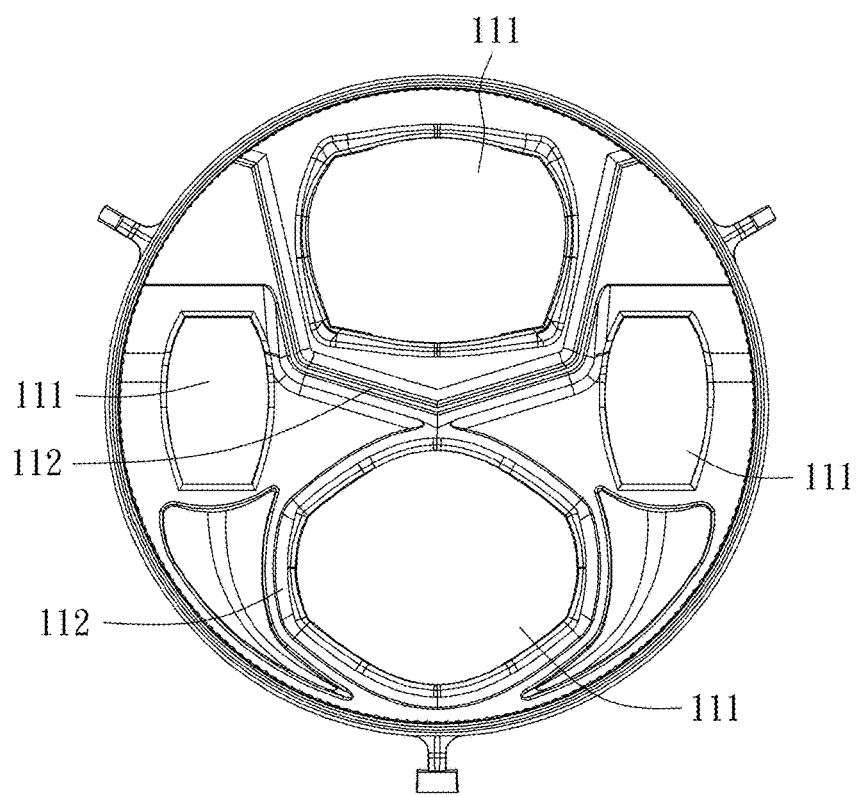
FIG. 6 is a front view of a portion of the lamp base of an exemplary embodiment of the present invention.
Figure 7:
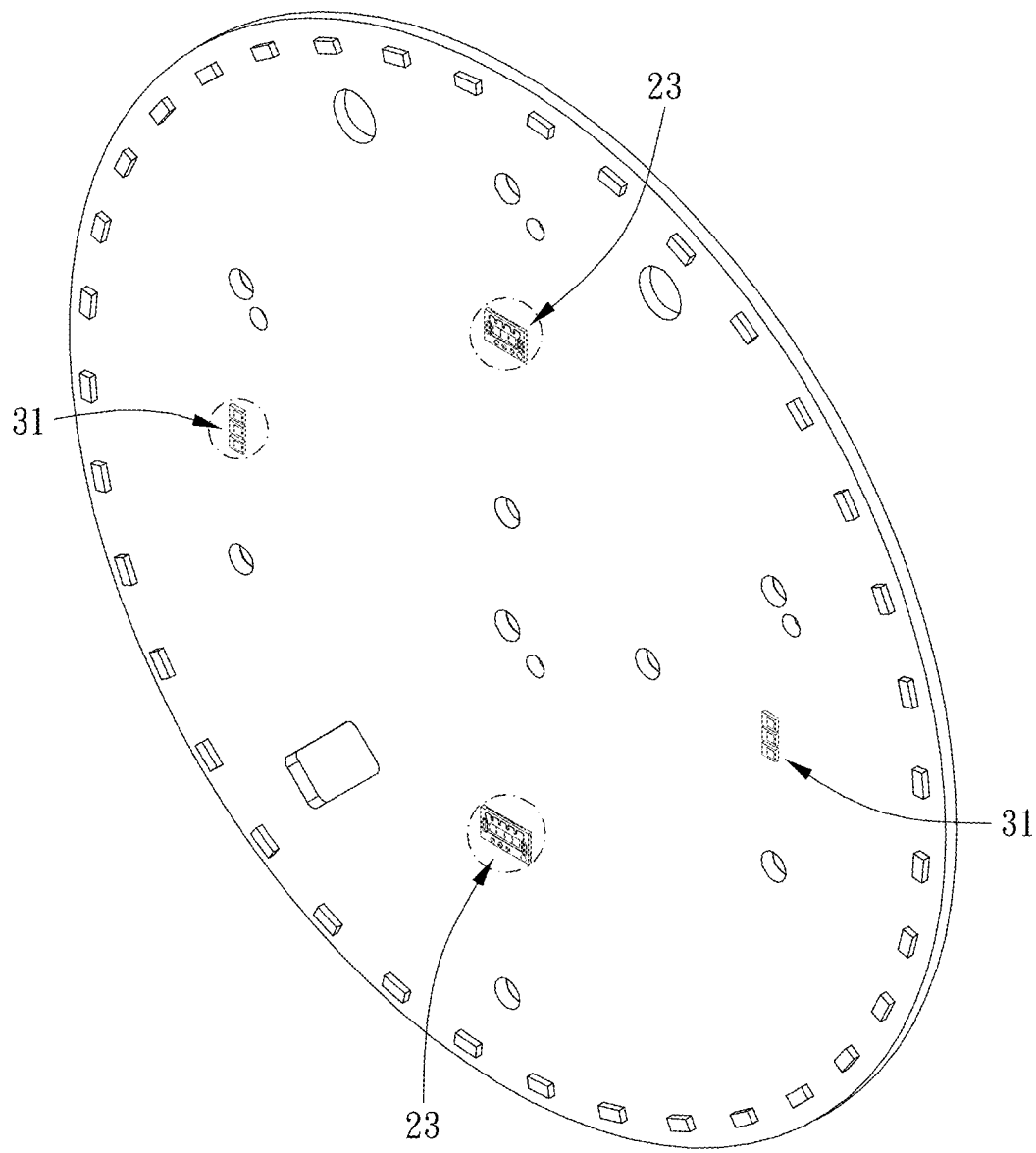
FIG. 7 is a perspective view of a circuit board of the lamp base of an exemplary embodiment of the present invention.
Figure 8:
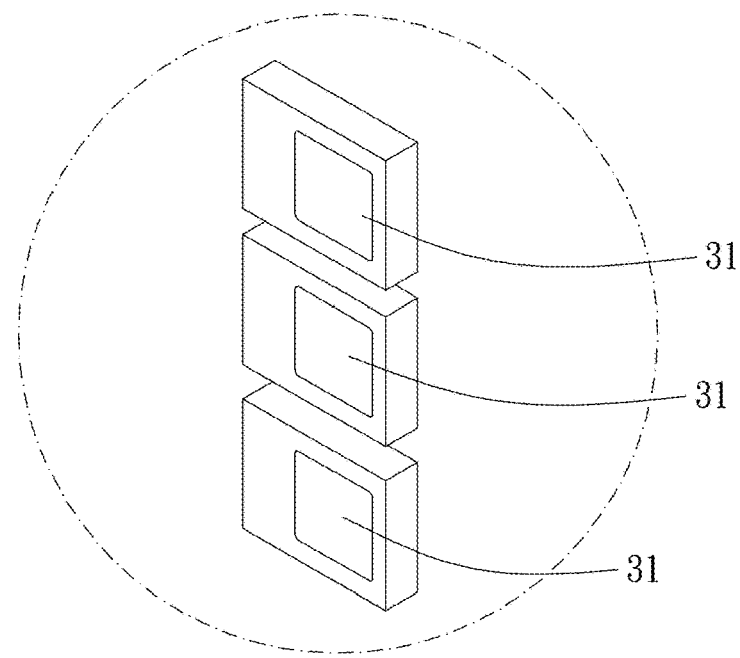
FIGS. 8 to 10 are schematic diagrams of a light device of an exemplary embodiment of the present invention.

Please refer to FIGS. 1 to 15 for an exemplary embodiment of the present invention. A motorcycle lamp 1 of the present invention includes a lamp base 10, two main light devices 20, only two auxiliary light devices 30, a controller 40, and a tilt angle detector 50.

The lamp base 10 includes a mounting surface 11. The lamp base 10 defines a first direction D1 and a second direction D2 perpendicular to each other. In this embodiment, the first direction D1 (horizontal direction) and the second direction D2 (vertical direction) are perpendicular to each other. The two main light devices 20 are spaced apart and disposed on the mounting surface 11. The two main light devices 20 are located on opposite sides in the first direction D1. The two main light devices 20 may be, for example, a low beam device and a high beam device. The only two auxiliary light devices 30 are spaced apart and disposed on the mounting surface 11. The only two auxiliary light devices 30 are located on opposite sides in the second direction D2. Each of the only two auxiliary light devices 30 includes a plurality of light emitting elements 31 and an auxiliary light lens 32. The plurality of light emitting elements 31 are arranged in a direction non-parallel to the first direction D1 (vertically or at other angles). The auxiliary light lens 32 covers the plurality of light emitting elements 31. The controller 40 is connected to and configured to control the two main light devices 20 and the only two auxiliary light devices 30. The tilt angle detector 50 is in communication with the controller 40 (wiredly or wirelessly). The tilt angle detector 50 is configured to detect and obtain a tilt angle data of the motorcycle. The controller 40 controls at least one of the plurality of light emitting elements 31 of one of the only two auxiliary light devices 30 to emit light according to the tilt angle data. As such, the illumination insufficiency caused by the displacement of the illumination area of the main light devices 20 due to the tilted state of the motorcycle can be compensated, thereby providing a wide-range illumination without blind spots and improving driving safety. Furthermore, since only a single auxiliary light device 30 is disposed on each of the opposite sides in the second direction D2, the structure and components are simple, the manufacturing and assembly/disassembly are easy, and the cost is lower.

The mounting surface 11 includes a plurality of mounting holes 111, and the two main light devices 20 and the only two auxiliary light devices 30 are respectively disposed within the plurality of mounting holes 111, resulting in a compact structure, stable installation, and reduced overall dimensions. The two main light devices 20 include a first main light device 21 and a second main light device 22. A ratio of a dimension of the first main light device 21 in the first direction D1 to a dimension of the first main light device 21 in the second direction D2 is defined as a first ratio, a ratio of a dimension of the second main light device 22 in the first direction D1 to a dimension of the second main light device 22 in the second direction D2 is defined as a second ratio, and the first ratio is greater than the second ratio. Accordingly, the first main light device 21 provides a wider illumination range, and the second main light device 22 provides a deeper illumination range.

Figure 9:
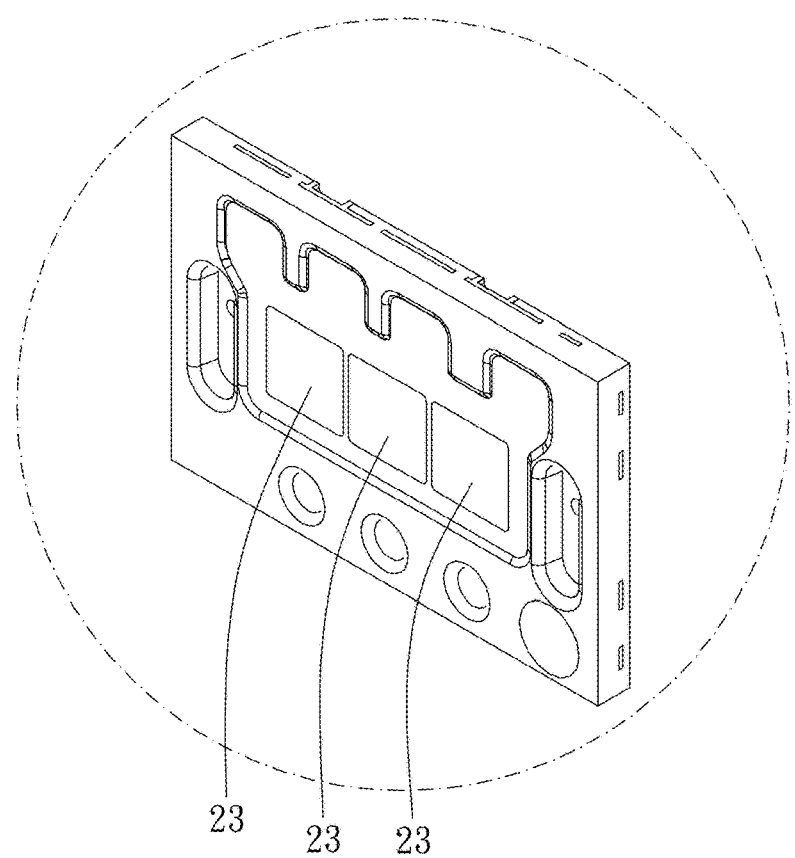
Figure 10:
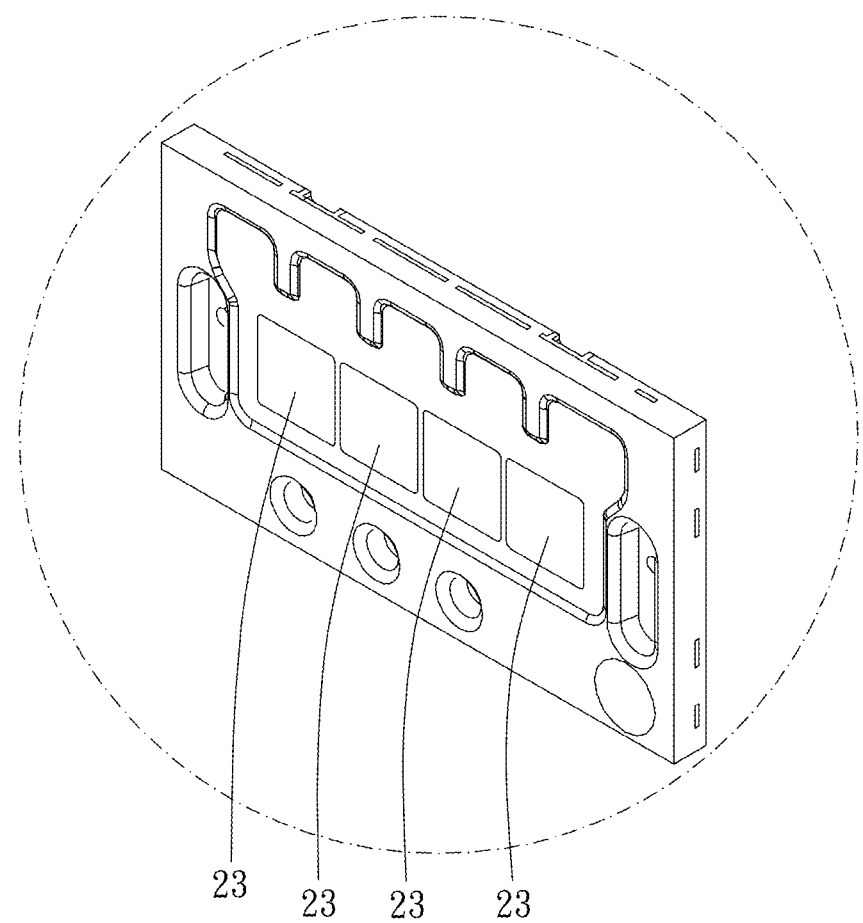

Preferably, the plurality of light emitting elements 31 of the only two auxiliary light devices 30 are relatively farther away from one of the two main light devices 20 than the other. For example, the first main light device 21 is a low beam device and is located relatively higher, while the second main light device 22 is a high beam device and is located relatively lower. Since the illumination intensity of the low beam device (fewer light emitting diodes 23, as shown in FIG. 9) is weaker than that of the high beam device (more light emitting diodes 23, as shown in FIG. 10), the only two auxiliary light devices 30 can effectively compensate for the insufficient illumination area of the low beam device.

In this embodiment, the two main light devices 20 are light emitting diode light devices and each includes at least one light emitting diode 23. The plurality of light emitting elements 31 are light emitting diodes. Each of the two main light devices 20 further includes a main light lens 24, and the main light lens 24 covers at least one light emitting diode 23 of the main light device 20. The light emitting diode has advantages such as small size, high power, strong illumination, and long service life.

Preferably, the tilt angle detector 50 is a gyroscope and may also be a tilt sensor implemented using Micro-Electro-Mechanical Systems (MEMS) technology or other devices configured to detect a tilt angle. When the motorcycle tilts toward a side (e.g., left side or right side) relative to the second direction D2, the controller 40 controls one of the auxiliary light devices 30 located on the same side in the second direction D2 to emit light. The tilt angle data includes a tilt angle value. Preferably, the greater the tilt angle value is, the number of the plurality of light emitting elements 31 of the auxiliary light device 30 which are controlled by the controller 40 to emit light is greater, wherein the number of the plurality of light emitting elements 31 emitting light increases from top to bottom.

In this embodiment, a connection line tangent to an upper end and a lower end of the two auxiliary light devices 30 is defined as a first reference line L1, the first reference line L1 passes between the two main light devices 20 without passing through either of the two main light devices 20. With such a positional configuration, all light devices can provide a more comprehensive supplementary illumination effect. Each of the auxiliary light devices 30 includes a plurality of light emitting elements 31, and the number of the plurality of light emitting elements 31 is three (however, it may be two or more than three). A connection line tangent to an upper end of the plurality of light emitting elements 31 of one of the auxiliary light devices 30 and a lower end of the plurality of light emitting elements 31 of the other auxiliary light device 30 is defined as a second reference line L2, and an included angle between the second reference line L2 and the first direction D1 is not greater than 15 degrees, thereby providing sufficient supplementary illumination coverage while ensuring preferable illumination brightness.

Preferably, the mounting surface 11 further includes a rib structure 112, the rib structure 112 extends between any adjacent two of the two main light devices 20 and the only two auxiliary light devices 30, and this can precisely define the projection illumination areas of each of the main light devices 20 and each of the auxiliary light devices 30, providing precise and effective illumination effects.

Figure 11:
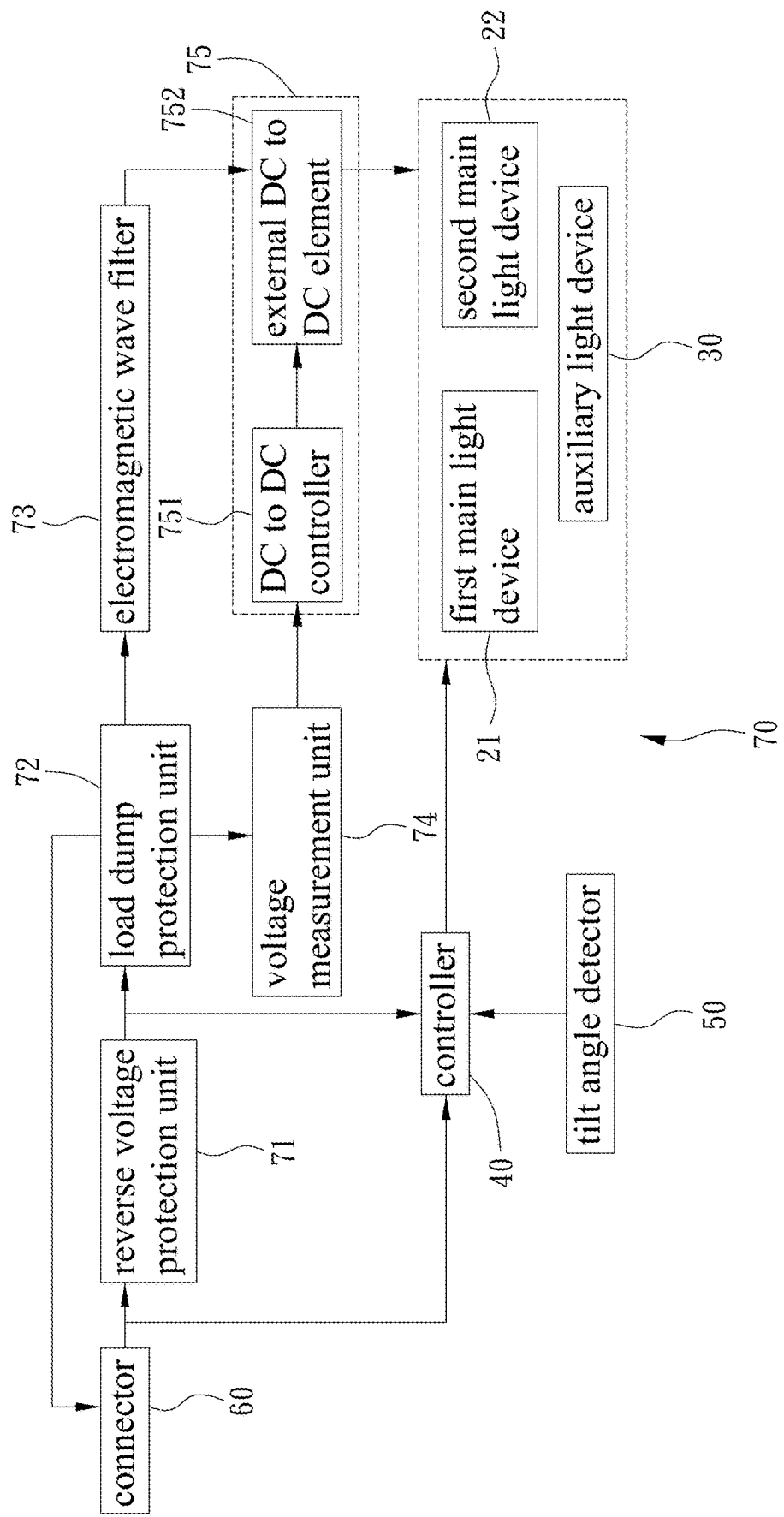
FIG. 11 is a block diagram of the structural relationship of an exemplary embodiment of the present invention.

Please refer to FIG. 11, the controller 40 is connected to a connector 60 of the motorcycle, the connector 60 is configured to electrically or communicatively connect to an operation component of the motorcycle (such as a toggle switch, a button, or a touch device). The controller 40 can switch to activate one of the main light devices 20 (the low beam device or the high beam device) according to the operation of a user. The power of the motorcycle is supplied to the main light device 20 through the connector 60 and a circuit unit 70. In this embodiment, the circuit unit 70 includes a reverse voltage protection unit 71 connected to the connector 60, a load dump protection unit 72 connected to the reverse voltage protection unit 71, an electromagnetic wave filter 73 connected to the load dump protection unit 72, a voltage measurement unit 74 connected between the load dump protection unit 72 and the electromagnetic wave filter 73, and a direct current to direct current (DC to DC) unit 75 connected to the electromagnetic wave filter 73. The controller 40 is further connected between the connector 60 and the reverse voltage protection unit 71 and further connected between the reverse voltage protection unit 71 and the load dump protection unit 72. The load dump protection unit 72 is grounded through the connector 60 (or may be grounded through another path or directly grounded). The DC to DC unit 75 is connected to the two main light devices 20 and the only two auxiliary light devices 30. Specifically, the DC to DC unit 75 includes a DC to DC controller 751 and an external DC to DC element 752, wherein the DC to DC controller 751 is connected to the voltage measurement unit 74, and the external DC to DC element 752 is connected to the DC to DC controller 751. The external DC to DC element 752 is connected to the two main light devices 20 and the only two auxiliary light devices 30. As such, a stable voltage can be provided, component damage caused by surge can be avoided, electromagnetic interference can be reduced, and different required lighting power can be supplied.

Figure 12:
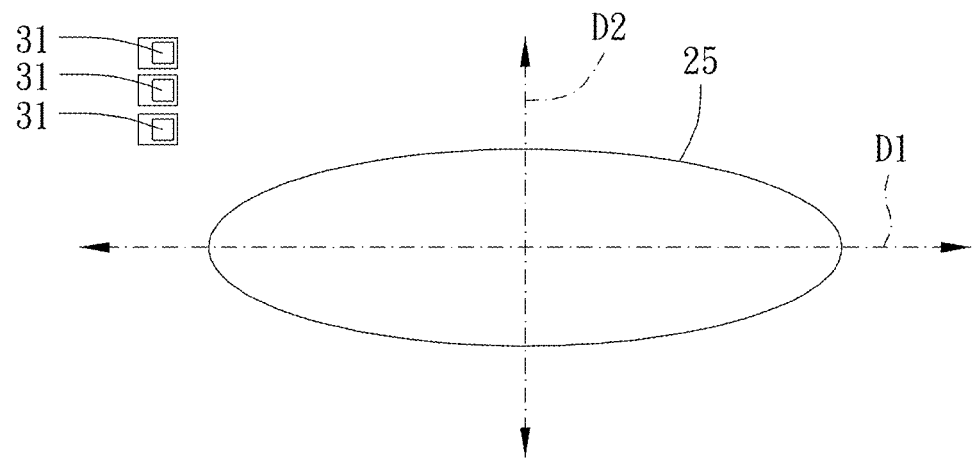
FIG. 12 is a schematic diagram of the illumination area of an exemplary embodiment of the present invention in a non-tilted state.
Figure 13:
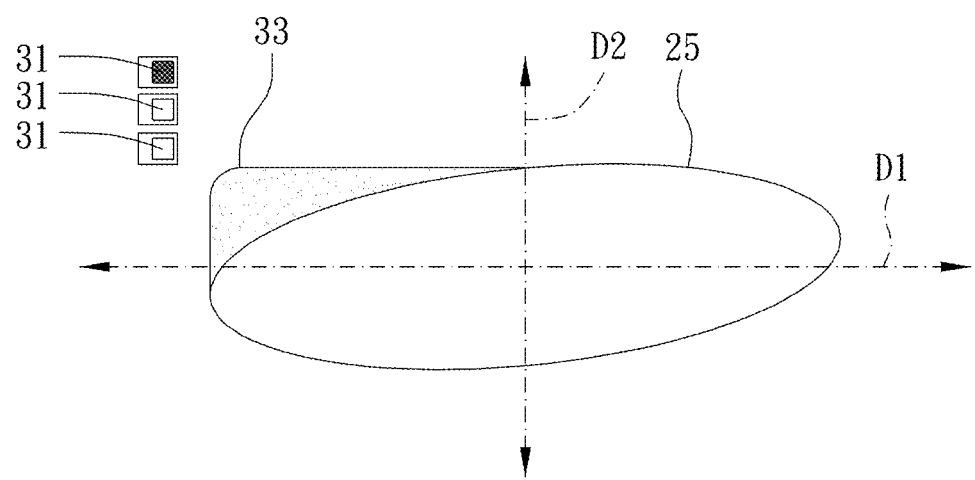
FIGS. 13 to 15 are schematic diagrams of the illumination area of an exemplary embodiment of the present invention in different tilted states.
Figure 14:
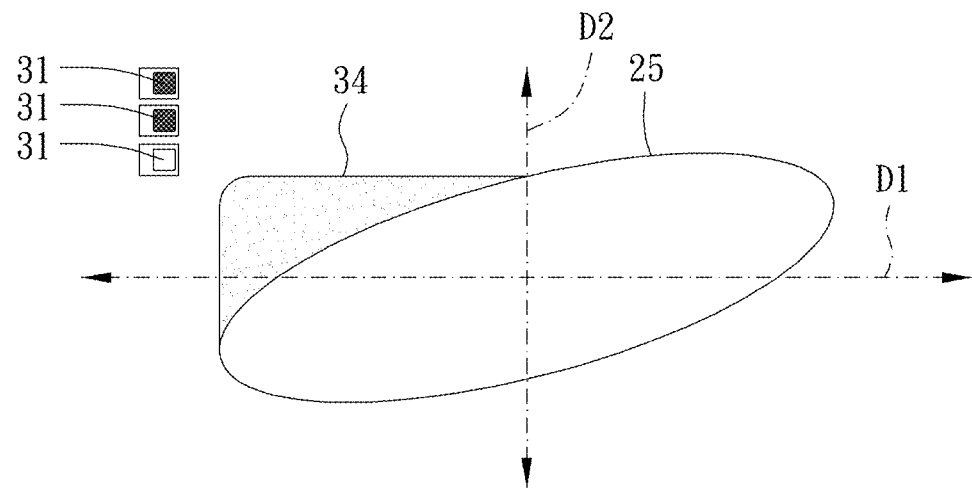
Figure 15:
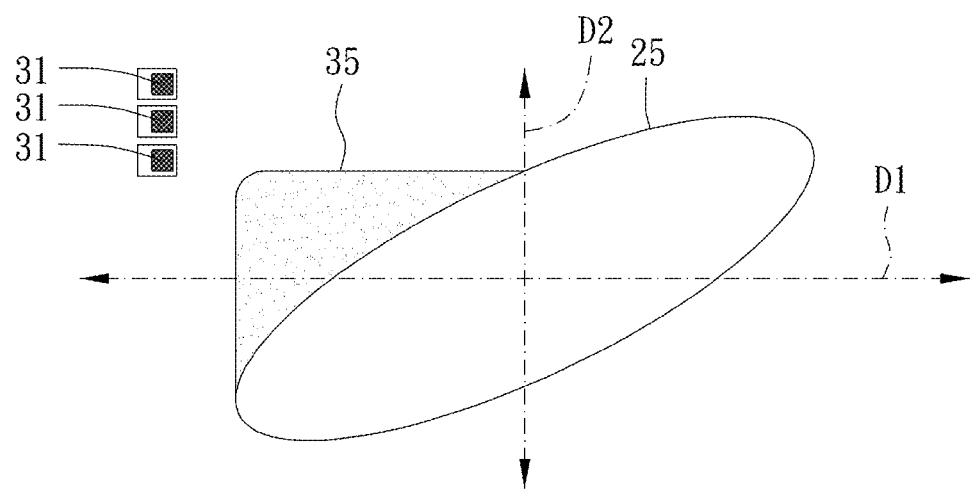

When the tilt angle detector 50 detects that the motorcycle is tilting, the tilt angle data is obtained and transmitted to the controller 40. The controller 40 controls the light emitting element 31 of the auxiliary light device 30 located on the tilted side to emit light according to the tilt angle data. The following embodiments are provided as examples but are not limited thereto. As shown in FIG. 12, when the tilt angle of the motorcycle is 0 degrees, the illumination area 25 of the main light device 20 is not tilted, and none of the plurality of light emitting elements 31 emits light. As shown in FIG. 13, when the tilt angle of the motorcycle is 5 degrees, the illumination area 25 of the main light device 20 is tilted by 5 degrees, and the controller 40 controls one of the uppermost light emitting elements 31 to emit light to provide a first compensation illumination area 33. As shown in FIG. 14, when the tilt angle of the motorcycle is 10 degrees, the illumination area 25 of the main light device 20 is tilted by 10 degrees, and the controller 40 controls two upper ones of the light emitting elements 31 to emit light to provide a second compensation illumination area 34. As shown in FIG. 15, when the tilt angle of the motorcycle is 15 degrees, the illumination area 25 of the main light device 20 is tilted by 15 degrees, and the controller 40 controls all (three) of the light emitting elements 31 to emit light to provide a third compensation illumination area 35. That is, as the tilt angle of the motorcycle increases and the illumination area shifts more, more light emitting elements 31 are activated to effectively compensate for the insufficiently illuminated area.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A motorcycle lamp configured to be disposed on a motorcycle, the motorcycle lamp including:
   a lamp base including a mounting surface, and defining a first direction and a second direction perpendicular to each other;
   two main light devices spaced apart and disposed on the mounting surface, and located on opposite sides in the first direction;
   only two auxiliary light devices spaced apart and disposed on the mounting surface, and located on opposite sides in the second direction, each of the only two auxiliary light devices including a plurality of light emitting elements and an auxiliary light lens, the plurality of light emitting elements being arranged in a direction non-parallel to the first direction, the auxiliary light lens covering the plurality of light emitting elements;
   a controller connected to and configured to control the two main light devices and the only two auxiliary light devices; and
   a tilt angle detector in communication with the controller, configured to detect and obtain a tilt angle data of the motorcycle;
   wherein the controller controls at least one of the plurality of light emitting elements of one of the only two auxiliary light devices to emit light according to the tilt angle data.

2. The motorcycle lamp of claim 1, wherein the two main light devices include a first main light device and a second main light device, a ratio of a dimension of the first main light device in the first direction to a dimension of the first main light device in the second direction is defined as a first ratio, a ratio of a dimension of the second main light device in the first direction to a dimension of the second main light device in the second direction is defined as a second ratio, and the first ratio is greater than the second ratio.

3. The motorcycle lamp of claim 2, wherein the two main light devices are light emitting diode light devices and each includes at least one light emitting diode; the plurality of light emitting elements are light emitting diodes; the plurality of light emitting elements of the only two auxiliary light devices are relatively farther away from one of the two main light devices than the other; the tilt angle data includes a tilt angle value, and wherein the greater the tilt angle value is, the number of the plurality of light emitting elements of the only two auxiliary light devices which are controlled by the controller to emit light is greater from top to bottom; the tilt angle detector is a gyroscope; when the motorcycle tilts toward a side relative to the second direction, the controller controls one of the only two auxiliary light devices located on the same side in the second direction to emit light; a connection line tangent to an upper end and a lower end of the only two auxiliary light devices is defined as a first reference line, the first reference line passes between the two main light devices without passing through either of the two main light devices; the mounting surface includes a plurality of mounting holes, and the two main light devices and the only two auxiliary light devices are respectively disposed within the plurality of mounting holes; each of the only two auxiliary light devices includes three light emitting elements, a connection line tangent to an upper end of the plurality of light emitting elements of one of the only two auxiliary light devices and a lower end of the plurality of light emitting elements of an other of the only two auxiliary light devices is defined as a second reference line, and an included angle between the second reference line and the first direction is not greater than 15 degrees; each of the two main light devices further includes a main light lens, and the main light lens covers the at least one light emitting diode of the main light device.

4. The motorcycle lamp of claim 1, wherein the plurality of light emitting elements of the only two auxiliary light devices are relatively farther away from one of the two main light devices than the other.

5. The motorcycle lamp of claim 1, wherein the tilt angle data includes a tilt angle value, and wherein the greater the tilt angle value is, the number of the plurality of light emitting elements of the only two auxiliary light devices which are controlled by the controller to emit light is greater.

6. The motorcycle lamp of claim 1, wherein the tilt angle detector is a gyroscope.

7. The motorcycle lamp of claim 1, wherein when the motorcycle tilts toward a side relative to the second direction, the controller controls one of the only two auxiliary light devices located on the same side in the second direction to emit light.

8. The motorcycle lamp of claim 1, wherein a connection line tangent to an upper end and a lower end of the only two auxiliary light devices is defined as a first reference line, the first reference line passes between the two main light devices without passing through either of the two main light devices.

9. The motorcycle lamp of claim 1, wherein the mounting surface includes a plurality of mounting holes, and the two main light devices and the only two auxiliary light devices are respectively disposed within the plurality of mounting holes.

10. The motorcycle lamp of claim 1, wherein the mounting surface includes a rib structure, and the rib structure extends between any adjacent two of the two main light devices and the only two auxiliary light devices.

* * * * *